United States Patent [19]

Wollar et al.

[11] 4,375,342

[45] Mar. 1, 1983

[54] TWO-PIECE PLASTIC FASTENER

[75] Inventors: Burnell J. Wollar, Barrington, Ill.; Richard J. Schwind, Akron, Okla.

[73] Assignee: Phillips Plastic Corp., Phillips, Wis.

[21] Appl. No.: 272,114

[22] Filed: Jun. 10, 1981

Related U.S. Application Data

[63] Continuation-in-part of Ser. No. 224,955, Jan. 14, 1981.

[51] Int. Cl.³ .............................................. F16B 13/04
[52] U.S. Cl. ....................................... 411/41; 411/45; 411/57
[58] Field of Search ....................... 411/39, 40, 41, 43, 411/44, 45, 57

[56] References Cited

U.S. PATENT DOCUMENTS

| | | | |
|---|---|---|---|
| 2,542,144 | 2/1951 | Kearns | 411/41 |
| 2,941,439 | 6/1960 | Rapata | 411/41 |
| 3,033,624 | 5/1962 | Biesecker | 411/45 X |
| 3,074,134 | 1/1963 | Buechler | 411/45 X |
| 3,147,525 | 9/1964 | Teher | 411/44 |
| 3,188,905 | 6/1965 | Millet | 411/57 |
| 3,198,058 | 8/1965 | Barry | 411/57 |
| 3,385,158 | 5/1968 | Morin | 411/45 |
| 3,417,438 | 12/1968 | Schulpin | 411/41 |
| 3,918,130 | 11/1975 | Poe | 411/41 X |
| 4,276,806 | 7/1981 | Morel | 411/15 |

FOREIGN PATENT DOCUMENTS 884123 12/1961 United Kingdom ................. 411/57
642529 1/1979 U.S.S.R. ................................. 411/57

Primary Examiner—Thomas J. Holko
Attorney, Agent, or Firm—James E. Nilles

[57] ABSTRACT

A two-piece plastic fastener has a sleeve-like body comprising forwardly projecting flexible legs and having a concentric radially enlarged head at its rear end. Longitudinal slots in the body define the legs and space them apart laterally. A cylindrical plunger, forwardly insertable in the body to an operative position at which it holds the legs forwardly diverged, has two radially outwardly opening circumferential grooves, one near its front end, the other near its rear end. At the rear end of each slot in the body is a detent lug that has its rear end integrally connected with the body to have its front end flexible radially outwardly. These lugs detent-wise engage in the front groove to define a projecting position of the plunger and in the rear groove to define its operative position. Lugs and grooves are so configured as to offer more resistance to rearward than to forward plunger displacement. A concentric head on the rear of the plunger, substantially larger than the body head, is forwardly concave to overlie and conceal the body head when the plunger is in its operative position.

4 Claims, 11 Drawing Figures

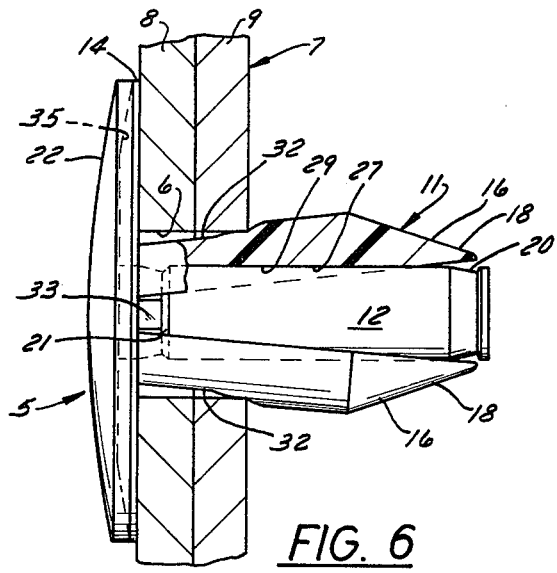
FIG. 6
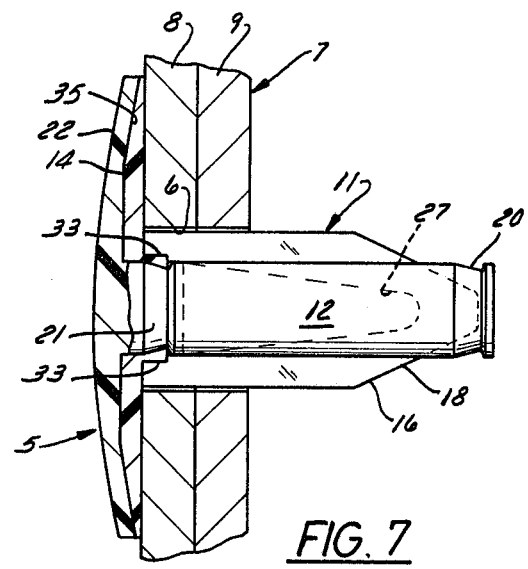
FIG. 7
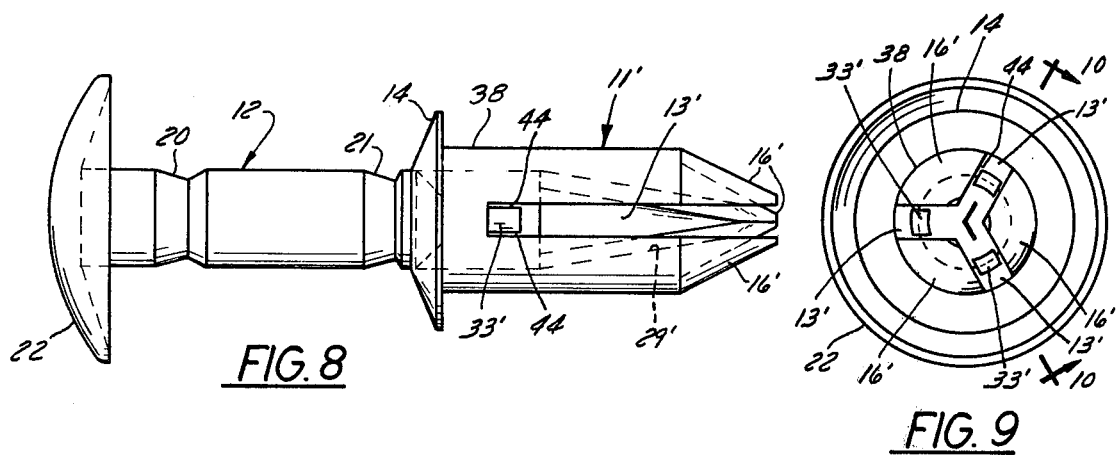
FIG. 8
FIG. 9
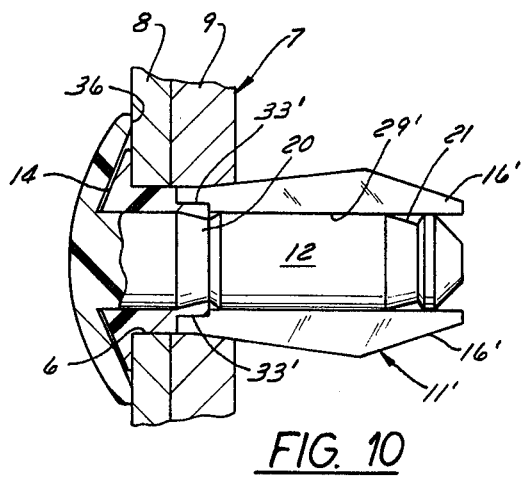
FIG. 10

TWO-PIECE PLASTIC FASTENER

RELATED APPLICATION

This application is a continuation-in-part of the applicants' copending application, Ser. No. 224,955, filed Jan. 14, 1981.

FIELD OF THE INVENTION

This invention relates to an improved plastic fastener of the type comprising an elongated sleeve-like body member that is axially forwardly insertable into a hole in a workpiece and a plunger that is forwardly insertable into the body member to secure the body member against displacement out of the workpiece; and the invention is more specifically concerned with a reuseable plastic fastener of the type just described wherein the body member has a head at its rear end that limits its forward insertion into a workpiece and has forwardly projecting legs, and wherein the plunger has a projecting position relative to the body member, partway received in it, from which the plunger can be readily driven forwardly to an operative position at which it keeps the legs diverged so that they confine the body member against rearward displacement out of a workpiece.

BACKGROUND OF THE PRIOR ART

Plastic fasteners of the general type to which this invention relates have been available in a variety of forms, each particularly intended to satisfy a set of requirements peculiar to one type of application and to be suitable for some other applications; but every such fastener has had limitations along with its desirable features.

U.S. Pat. No. 4,083,289, to Erickson, issued in 1978, disclosed a plastic fastener of the general type here under consideration, comprising a plunger insertable into a sleeve-like body with forwardly projecting legs. The legs and the plunger had opposing wedging surfaces whereby the plunger held the legs diverged when it was in a forward operative position in the body. Although satisfactory for many purposes, the fastener of the Erickson patent was not entirely suitable for situations where severe vibration could be encountered, as in automotive applications. The wedging surfaces on the plunger and the legs cooperated to exert a rearward force upon the plunger that was normally resisted by friction between the plunger and the body member, but such friction was relieved by vibration, allowing the plunger to back out of the body.

U.S. Pat. No. 3,385,158, issued to L. H. Morin in 1968, disclosed another plastic fastener that was of the general type here under consideration. As with the fastener of the above discussed Erickson patent, the Morin fastener had a sleeve-like body with forwardly projecting legs and had cooperating wedging surfaces on the legs and on its cylindrical plunger whereby the legs were diverged by forward movement of the plunger to a fully inserted operative position. Small spur-like radially projecting lugs on the plunger were intended to engage against forwardly facing abutments in the body member when the plunger was in its operative position, to hold the plunger against backing out of the body member under the influence of vibration. The abutments on the body member were located in the slots between the legs, and therefore the plunger had to be inserted in a position of its rotation that maintained alignment of its lugs with those slots. Furthermore, the lugs had to be small enough to be compressively deformed as the plunger moved forward in the body member, since its bore could not be relieved to accommodate the lugs; and therefore the lugs could not be relied upon to make secure engagement with the abutments in the body member. Being so small, the lugs could easily be broken away or permanently deformed by repeated insertions and removals of the plunger, and therefore the fastener was not satisfactorily re-useable.

In most of the prior fasteners of the type here under consideration, the plunger and the body member were maintained in preliminarily assembled coaxial relationship by virtue of their being molded integrally with one another and connected by a thin flashing. The flashing was intended to be broken by the initial application of forward driving force to the plunger; but to ensure that the flashing would be thin enough to fracture cleanly, the plunger could initially project into the body member to only a very slight depth, and therefore the plunger received practically no guidance from the body member during the first part of its forward movement. As a result, a special tool had to be used, or special skill had to be exercised, to avoid tilting the plunger as it was driven forward. If a fastener of this type was reuseable, its plunger tended to become separated from the body member when the fastener was removed from a workpiece, so that re-installation involved the inconvenience of finding and manipulating each of the two parts of the fastener.

A somewhat improved form of reuseable fastener was disclosed in the above identified copending application, Ser. No. 224,955. Its sleeve-like body had a substantially tubular rear portion from which legs projected forwardly and inside which there were short circumferentially extending lands of semi-circular cross-section. The plunger had two circumferential grooves, one near its front end and one near its rear end, each having a semi-circular cross-section corresponding to that of the lands. The lands engaged in the front groove when the plunger was in its rearward projecting position and engaged in the rear groove when the plunger was in its forward operative position, thus cooperating with the grooves to provide detents that defined the two plunger positions. However, the lands had to be compressively deformed as the portion of the plunger between its grooves passed in engagement with them, and such compression was not suitable where the fastener had to be frequently withdrawn and reinstalled. Furthermore, if the plunger was for any reason not fully inserted into the body, so that the lands were only partially seated in the rear plunger groove and remained under compressive deforming stress, the lands could eventually take a set that allowed the plunger to creep rearward in the body under the influence of vibration.

The sleeve-like body of a fastener of the type here under consideration usually has a radially enlarged head at its rear end that defines the limit of its forward insertion into a hole in a workpiece. Usually there is also a head on the rear end of the plunger. In prior fasteners, when the plunger was in its forward operative position in the body, the head on the plunger would overlie or partly overlie the body head in such a manner as to present the appearance of a knob-like bulge or protuberance on the body head, and there was usually a circumferential crack or crevice between the plunger head and the body head in which dirt could settle. With fasteners that were in hidden or inconspicuous locations, this unsightly appearance of the heads was of no consequence, but fasteners of the type here under consideration are coming into increasing use for securement of automobile body interior door panels, roof liners and the like, in installations where the fastener heads are fully visible. Heretofore fasteners intended for such applications have been designed solely with regard to functional and utilitarian considerations, although it was obvious that they were unsatisfactory from an aesthetic standpoint. Apparently it was not obvious how to arrange such a fastener so that the visible part of it would be attractive while still meeting all of the functional requirements, including the requirement that the plunger be arranged for ready retraction in the sleeve-like body in order to permit the fastener to be removed from a workpiece and reused.

SUMMARY OF THE INVENTION

The general object of the present invention is to provide an inexpensive, indefinitely reuseable plastic fastener that comprises an elongated sleeve-like body member suitable for installation in a circular hole and a plunger forwardly insertable into the body member to secure it in the hole, wherein the plunger has a circular cross-section all along its length, to be insertable into the body member in any position of rotation, and wherein the plunger is securely confined against backing out of the body member under vibration but can nevertheless be deliberately retracted for withdrawal of the fastener from the hole.

Another object of the invention is to provide a plastic fastener of the character described wherein the plunger is held in a rearwardly projecting position relative to the body member, partway received therein and rather securely confined against inadvertent withdrawal therefrom, but wherein the plunger can be readily driven all the way into the body member to a forward operative position without the need for a special tool and can be readily drawn back to its projecting position and used as a handle for removal of the fastener from a workpiece in which it is installed.

A further object of the invention is to provide a reuseable two-piece fastener of the character described which, when installed, presents the appearance of having a neat, simple one-piece head, even though the fastener comprises a plunger that extends through a head on a sleeve-like body of the fastener.

It is also an object of the invention to provide a fastener of the character described, having a plunger which has defined projecting and operative positions relative to a sleeve-like body, and wherein the plunger, in its projecting position, extends far enough into the rear of the body to derive substantial guidance from it, so that no special skill or special tool is needed to avoid application of tilting forces to the plunger as it is driven forward to its operative position in the body.

Another important object of this invention is to provide a reusable fastener comprising a sleeve-like body and a plunger that has the above described projecting and operative positions relative to the body, wherein said positions of the plunger are detent defined, wherein the plunger can be more easily moved forwardly than rearwardly from its projecting position, and wherein the detent means for defining said plunger positions can sustain numerous back and forth movements of the plunger between those positions without significant wear or deformation.

In general, the objects of the invention are achieved in a fastener comprising a sleeve-like elongated body that is axially forwardly insertable into a hole in a workpiece and a plunger that is axially forwardly insertable into the body to secure it against rearward displacement. A body head on a rear end of the body provides a forwardly facing abutment that limits forward insertion of the body into a workpiece. The body has forwardly projecting legs which are laterally spaced from one another by slots extending longitudinally in the body from near said body head to the front end of the body. The legs and a front portion of the plunger have cooperating wedging surfaces whereby the legs are maintained diverged while the plunger is in an operative forward position in the body. The fastener of this invention is characterized by its plunger having front and rear radially outwardly opening, transversely extending grooves therein that are spaced from one another by a substantial distance along the length of the plunger, each of said grooves having a substantially V-shaped profile, with one surface that faces obliquely forwardly and another surface that faces obliquely rearwardly. The body has detent lugs projecting forwardly in said slots, near the rear ends thereof, the rear end of each detent lug being connected with the body so that the front end of the detent lug is flexingly swingable radially outwardly, each said lug having a radially inner surface which is inclined forwardly and radially inwardly for detent cooperation with said grooves in the plunger.

In a preferred embodiment, the plunger has on its rear end a coaxial head of substantially larger diameter than said head on the body member, said head on the plunger being forwardly concave to receive and cover the head on the body member when the plunger is in its operative position.

BRIEF DESCRIPTION OF THE DRAWINGS

In the accompanying drawings, which depict what are now regarded as preferred embodiments of the invention;

FIG. 6 is a view mainly in elevation, comparable to FIG. 5, but with a portion broken away, and showing the fastener fully installed in a workpiece, with the plunger in its forward operative position;

FIG. 7 is a view in longitudinal section, generally comparable to FIG. 3, but showing the fastener in the condition in which it is illustrated in FIG. 6;

FIG. 8 is a view in elevation of a modified embodiment of the fastener of this invention, in its condition as molded;

FIG. 9 is a front end view of the fastener shown in FIG. 8; and

FIG. 10 is a view in longitudinal section, taken on the plane of the line 10—10 in FIG. 9, showing the fastener installed in a workpiece and with its plunger in its operative position.

DETAILED DESCRIPTION OF PREFERRED EMBODIMENTS OF THE INVENTION

Figure 5:
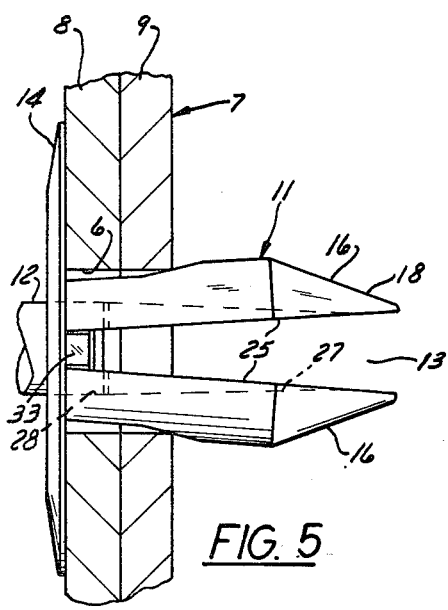
FIG. 5 is a view in elevation, at right angles to the view in FIG. 1, but showing the fastener in the condition in which it is illustrated in FIG. 4.
Figure 4:
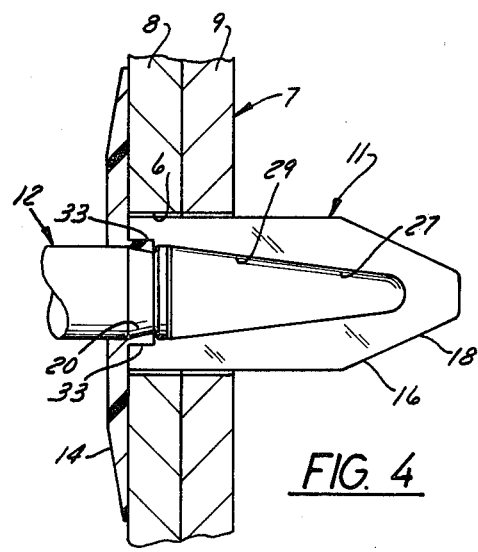
FIG. 4 is a view generally similar to FIG. 3 but showing the fastener received in a workpiece and with its plunger in its projecting position.
Figure 4A:
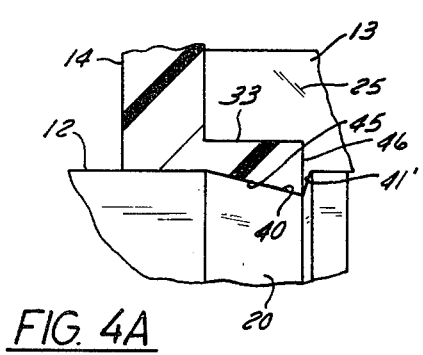
FIG. 4a is a detail enlargement in longitudinal section through the detent lug and a detent groove.

A fastener 5 of this invention is typically molded of a firm but resilient plastic such as polyethylene or nylon and is intended to be inserted into a hole 6 in a workpiece 7. As shown in FIGS. 4 and 5, the workpiece 7 can comprise a pair of panels or sheets 8, 9 that are held in flatwise superimposed relationship by means of the fastener 5, and the hole 6 in which the fastener is received is defined by registering bores through the panels or sheets 8, 9.

In general, the fastener 5 comprises an elongated sleeve-like body 11 and an elongated plunger 12 that is axially insertable forwardly into the body to secure the fastener in the workpiece 7.

In the embodiments of the invention that are here illustrated, the plunger is intended to be received in a round hole 6 in a workpiece 7, and accordingly the external surface of the sleeve-like body 11 is of circular cross-section and the plunger 12 is likewise of circular cross-section. However, as the description proceeds it will be apparent that the principles of the invention are readily adaptable to a fastener intended for reception in a square, rectangular or other non-circular hole, having a body with an external cross-section shaped in conformity with the hole in which it is to be received and having a plunger of generally corresponding cross-section.

At its rear or outer end the body 11 has a coaxial head 14, in the nature of an integral, radially outwardly projecting circumferential flange, providing a forwardly facing abutment that engages the workpiece 7 around the hole 6 therein to define the forward limit of insertion of the body into the workpiece. In the body 11 there are slots 13 that extend longitudinally from near its head 14 all the way to its front end, to define forwardly projecting legs 16 that are disposed symmetrically to the longitudinal axis of the body and are laterally spaced apart by the slots 13. Each of the legs 16 can flexingly swing relative to the rear part of the body in directions that carry the front end of the leg radially towards and from the body axis.

The length of the body 11 is proportioned to the thickness of the workpiece 7 for which the fastener is intended and is such that the legs 16 can project forwardly beyond the front surface of the workpiece.

The particular form of body 11 that is illustrated in FIG. 1-7 has two legs 16 that have substantial forward taper at their front ends, as at 18, for guiding the body into a hole in which it is to be received. In this case the legs 16 are forwardly divergent when they are in their unflexed or relaxed conditions; but upon forward insertion of the body into a hole 6, edge portions of the hole cooperate with the tapered front portions 18 of the legs 16 to flexingly cam the legs towards one another, so that they can pass through the hole and emerge at the front side of the workpiece. When the body 11 is fully received in a hole 6 for which it is intended, with the body head 14 abutting the rear surface of the workpiece, the legs 16 are under little or no flexing bias and because of their divergent relationship they tend to resist displacement of the body out of the hole, although the body can be rearwardly withdrawn from the hole if the plunger 12 is not in a forward operative position in the body.

The slots 13 between the legs 16 define flat inner surface portions 25 on the legs that are forwardly divergent when the legs are relaxed and are substantially parallel to one another when the legs are flexingly converged sufficiently to be receivable in a hole for which the fastener is intended. In the inner surface 25 of each leg there is a cavity 27 that cooperates with the corresponding cavity 27 in the other leg to confine the plunger 12 to coaxial fore-and-aft motion in the body. The plunger 12 is substantially cylindrical, having a uniform diameter all along its length except at each of a pair of transversely extending, radially outwardly opening grooves 20, 21 and at a concentric radially enlarged head 22 on its rear or outer end. The cavities 27 in the two body legs 16 cooperate to define, in effect, a cylindrical bore or central opening concentric to the body axis, wherein the plunger 12 has a close sliding fit. These cavities 27 have cylindrical rear portions 28 which extend a relatively short distance forward from the body head 14 and merge rearwardly into surface portions of the bore through the body head 14. The front portions 29 of the cavities 27 are defined by internal surfaces that taper forwardly in both width and depth, so that they appear to be frustoconical relative to the flat inner leg surfaces 25 around them; but when the legs 16 are in their relaxed forwardly divergent condition the surfaces of these apparently frustoconical cavity portions 29 are transversely curved concentrically to the body axis, at a radius that is substantially constant along the length of the cavity and substantially equal to the radius of the plunger. Hence, except for the detents hereinafter described, the plunger can slide rather easily to its forward operative position, diverging the legs 16 only slightly or not at all from their relaxed conditions. Of course, when the plunger is in that operative position, it prevents the legs 16 from being flexed towards one another and thus secures the fastener against withdrawal from a hole 6 in a workpiece.

Owing to leverage, flexing stresses in the legs 16 tend to be concentrated near the head 14 on the body. To ensure that such stresses will not normally exceed the yield point of the material and cause cracking, each leg, in a zone forwardly adjacent to the head, has a reduced thickness in the directions of flexing, owing to a cutout 32 that provides the leg with a flat outer surface which is parallel to its inner slot-defining surface 25.

The two transversely extending grooves 20, 21 in the plunger 12 are near its front end and its rear end, respectively. Each of those grooves is intended for detent-defining cooperation with detent lugs 33 that are formed integrally with the body at the rear ends of the longitudinal slots 13.

In the cylindrical plungers here illustrated, the transverse grooves 20, 21 are circumferential and extend all the way around the plunger. In the case of a plunger having a non-square but rectangular cross-section, or which is otherwise constrained by its shape to enter the body in only two rotational orientations, the corresponding transversely extending grooves would need to be formed only in a pair of opposite sides of the plunger, to be entered by detent lugs correspondingly located in the body. In a plunger having a square or regularly polygonal cross-section, each transverse groove would preferably extend completely around the plunger to be cooperable with detent lugs in any rotational orientation in which the plunger could be received in the body.

The detent lugs 33, which are disposed diametrically opposite one another in the fastener body 11, engage in the front plunger groove 20 to define a projecting or preliminarily assembled position of the plunger 12 relative to the body 11 and engage in the rear plunger groove 21 to define the operative or fully inserted position of the plunger. Each of the plunger grooves 20, 21 is substantially V-shaped in profile, having one surface 40 that faces obliquely forwardly and radially outwardly and another surface 14 that faces obliquely rearwardly and radially outwardly.

Each of the detent lugs 33 has its rear end integrally connected with the fastener body, whereas its side surfaces are slightly spaced by narrow slits 44 from the adjacent flat surfaces 25 on the legs 16, so that each lug 33 is free for flexing that swings its front end radially inwardly and outwardly. Each detent lug has a radially inner surface 45 which, in the unflexed condition of the lug, is inclined forwardly and radially inwardly. A front face 46 on the detent lug, which is preferably oriented normal to the fastener axis when the lug is relaxed, thus meets the radially inner face 45 at an acute-angled corner.

The forwardly oblique surface 40 of each of the plunger grooves 20, 21 preferably has an angle of inclination to the fastener axis which matches that of the radially inner surface 45 on each detent lug. Hence when the plunger 12 is in its projecting position the detent lugs 33 make good surface-to-surface engagement with the surface 40 of the front groove 20, to provide for a smooth camming action whereby the detent lugs are flexed radially outwardly as the plunger 12 is started forwardly to its operative position; and when the plunger is in its operative position the detent lugs can again be fully relaxed while making good surface-to-surface engagement with the surface 40 of the rear plunger groove 21.

The obliquely rearwardly facing surface 41 of the rear plunger groove 21 is somewhat more steeply inclined to the plunger axis than the groove surfaces 40, so that it cooperates with the front faces 46 of the detent lugs 33 to offer rather firm resistance to rearward displacement of the plunger out of its operative position, although it does not prevent such displacement of the plunger. Preferably the obliquely rearwardly facing surface 41' of the front plunger groove 20 is even more steeply inclined to the plunger axis so as to present even greater resistance to rearward withdrawl of the plunger beyond its detent-defined projecting position, without however preventing such withdrawal. In this way the plunger 12, when in its projecting position, can serve as a handle or knob by which sufficient rearward force can be applied to the fastener body 11 to flexingly converge the legs 16 as the fastener is withdrawn from a hole.

It will be apparent that the amount of resistance that is presented to displacement of the plunger in each direction from each of its detent defined positions can be predetermined on the basis of the angle of inclination of each of the surfaces 40, 41 of each of the V-profile plunger grooves 20, 21. It will also be apparent that detent bias is due to flexing of the detent lugs 33 about their rearward connections with the rest of the body 11, rather than to compressive deformation of any part that could result in breakage, undue wear or its taking a permanent set.

Figure 1:
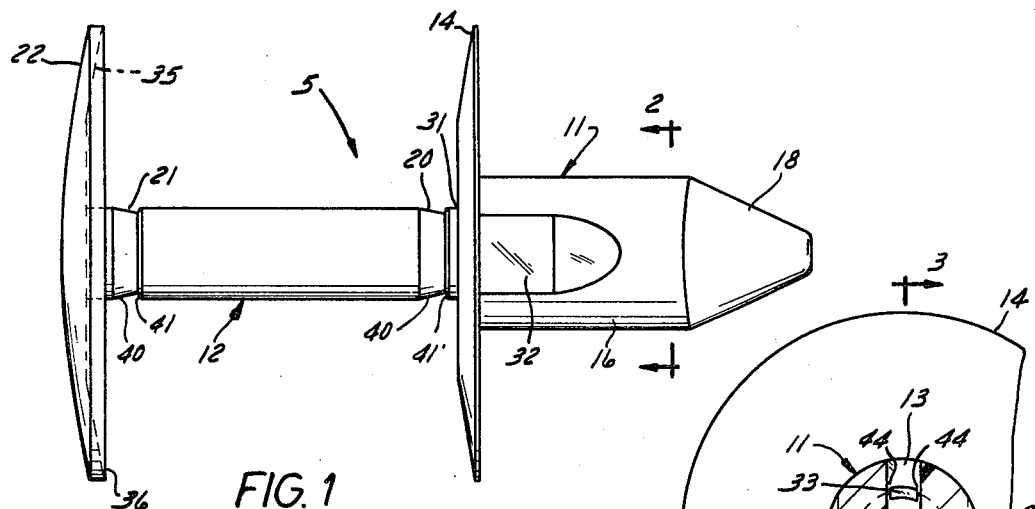
FIG. 1 is a view in side elevation of a fastener embodying the principles of this invention, in its condition as molded.
Figure 2:
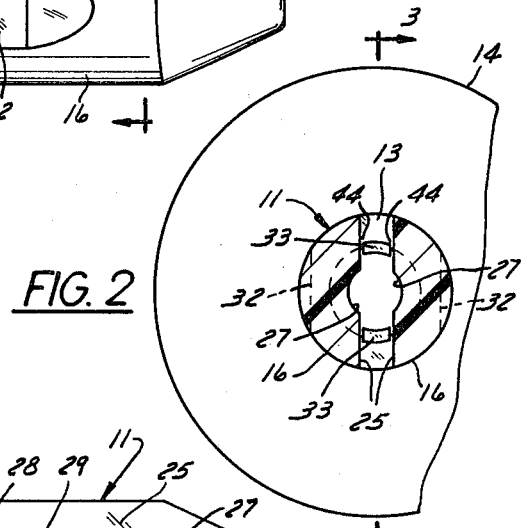
FIG. 2 is a view in cross-section, taken on the plane of the line 2—2 in FIG. 1.
Figure 3:
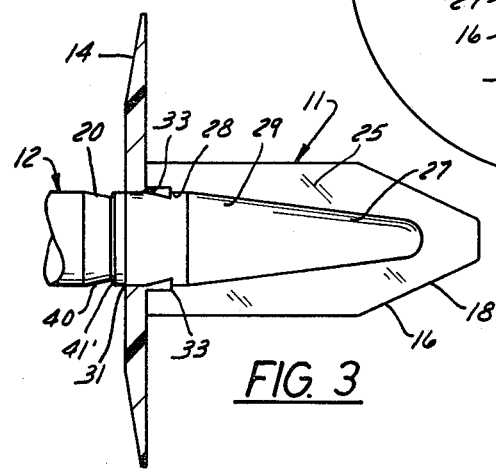
FIG. 3 is a view in longitudinal section, taken on the plane of the line 3—3 in FIG. 2.

In the production of the fastener of this invention, the plunger 12 and the body member 11 are preferably molded integrally with one another to comprise the unit shown in FIG. 2, with the inner end of the plunger projecting coaxially into the body member by a distance so small that its connection with the body member comprises an easily broken flashing, as at 31. As molded, the plunger 12 thus blocks the rear end of the opening through the body member. Consequently, the mold core (not shown) that defines the inner surfaces of the legs 16 of the body member must be drawn forwardly out of the body member at the conclusion of the molding operation, as will be obvious to those skilled in the relevant art.

When the piece comprising the plunger and the body is molded, immediately after the core is withdrawn and while the piece is still in the molding machine, forward force can be applied to the plunger 12 to break the flashing 31 between it and the body and drive the plunger into the body to its projecting position at which the detent lugs 33 engage in its front groove 20. In this position the plunger 12 is behind the tapering front portions 29 of the cavities in the legs, leaving the legs free for convergent swinging. However, the plunger is then far enough into the body to receive substantial guidance from it when the plunger is driven forward towards its operative position so that no special skill or special tool is needed to confine the plunger against tilting relative to the body.

With a cylindrical plunger and detent grooves 20, 21 that extend entirely around it, the plunger can be in any rotational orientation as it moves axially to each of its detent-defined positions in the body. It has been found that severe vibration sometimes causes the plunger to rotate in the body, but with the fastener of this invention such rotation is of no consequence.

It will be evident that the plunger 12 could be made without the head 22, to have its rear end flush with the rear surface of the body head 14 when the plunger is in its operative position, as in certain prior fasteners of this general type; but in that case retraction of the plunger would be so difficult that the fastener would be practically non-removable. Preferably, the plunger head 22 is at least as large in diameter as the body head 14 and is hollowed out at its front, as at 35, to be forwardly concave so that when the plunger is in its operative position, as shown in FIG. 6, the forwardly facing peripheral surface 36 on the plunger head 22 abuts the rear surface of the workpiece all around the body head 14, and the plunger head 22 fits over and completely conceals the body head 14, presenting a clean, unbroken appearance.

In the modified embodiment of the invention that is illustrated in FIGS. 8-10, the body 11' has three forwardly projecting legs 16' that are arranged symmetrically to its axis. The slots 13' between circumferentially adjacent legs 16' have their rear ends spaced a short distance forwardly of the head 14 on the body, and there is thus a tubular portion 38 of the body that extends between the head 14 and the legs 16' and has a uniform outside diameter along its length. The inside diameter of this tubular portion 38 is likewise substantially uniform along its length. The detent lugs 33', which have their rear ends integrally connected to the tubular portion 38 of the body and project forwardly in the longitudinal slots 13', are essentially counterparts of the detent lugs 33 in the first described embodiment.

When the body 11' is in the condition in which it is molded, the outer surfaces of its legs 16' constitute a continuation, for some distance forwardly, of the outer cylindrical surface of the tubular portion 38, and thus the legs 16' are not flexed as the body 11' is inserted into a hole 6 for which it is intended. Considering the legs 16' collectively, they have inner surface portions 29' that define a forwardly convergent cone and cooperate with the front portion of the plunger 12, as the plunger is driven forward to its operative position, to cam the legs 16' for flexing outward divergence, bringing them to the spread condition shown in FIG. 10 wherein they cooperate with the body head 14 to confine the fastener against axial displacement relative to the workpiece.

As in the first described embodiment, the plunger 12 has radially outwardly opening, transversely extending grooves 20, 21 of V-shaped profile which are spaced apart along its length and in which the lugs 33' in the body are detent-wise engageable to define projecting and operative positions of the plunger 12.

In further accordance with the first described embodiment, the fastener that is shown in FIGS. 8–10 preferably has a coaxial head 22 on its plunger 12 that is larger in diameter than the head 14 on the body and is forwardly concave to cover the body head 14 when the plunger is in its operative position.

It will be evident that the body 11' could have four (or more) forwardly projecting legs instead of the two or three that are shown in the embodiments here illustrated. It will also be obvious that the two legs of a fastener body like that of FIGS. 1–7 could be normally undiverged, like the legs of the fastener body shown in FIGS. 8–10 and that the three (or more) legs of a fastener body like that of FIGS. 8–10 could be in normally diverged relation to one another.

From the foregoing description taken with the accompanying drawings it will be seen that the fastener of this invention can be made at low cost, can be made in a variety of forms that are suitable for installation in holes of many shapes, is readily installed and removed, is reuseable, and is resistant to vibration so as to be well suited for automotive and similar installations.

What I claim is:

1. A plastic fastener for removable insertion through aligned openings in a plurality of workpieces to secure the latter together, said fastener comprising:

a flexible resilient body having inner and outer ends, a plunger having inner and outer ends, and frangible means for detachably securing the inner end of said plunger to the outer end of said body in preassembled aligned position;

said body comprising a cylindrical body shank insertable through said openings, a concentric body head integrally connected to the outer end of said body shank and having an underside for abutting one of said workpieces and limiting insertion of said body into said aligned openings, and a tapered body portion integrally connected to the inner end of said body shank to facilitate insertion into said aligned openings;

said body having a central opening extending axially therethrough, that portion of said opening through said body head and in said body shank near said outer end of said body being cylindrical, that portion of said opening in said body shank near said inner end of said body being conical;

said body comprising slots extending axially inwardly from said inner end of said body to said underside of said body head and cooperating with those portions of said opening in said body shank to define a plurality of flexible legs which are laterally spaced apart from one another and swingable toward and away from the longitudinal axis of said body, each of said legs including an external surface which diverges outwardly when said leg is flexed radially outwardly to engage another of said workpieces to prevent withdrawal of said fastener from said aligned openings, each of said legs further including an internal surface which comprises a cylindrical recess and another recess which diverges inwardly, said recesses being defined by portions of said central opening;

said body comprising detent lugs integrally connected thereto securing said plunger in different axial positions relative to said body, each detent lug being located within and near the outer end of a slot between a pair of adjacent legs, each detent lug being flexibly swingable radially outwardly from one position to another position relative to said central opening, each detent lug comprising an end surface transverse to the longitudinal axis of the body member, an outer surface spaced inwardly from the outer surface of said body shank, and an inner surface that inclines inwardly into said central opening and toward the inner end of said body and intersects said end surface at an acute angle;

said plunger comprising a cylindrical plunger shank and a concentric outer plunger head integrally connected to the outer end of said plunger shank for disposition adjacent said one of said workpieces;

said plunger head being larger in diameter than said body head and provided on the underside thereof with a recess for receiving and concealing said body head;

said plunger shank being provided near its outer end with a first detent-engaging groove and near its inner end with a second detent-engaging groove, each groove extending entirely around said plunger shank, each groove having a V-shaped cross-sectional configuration with one surface that slopes toward the outer end of said plunger and with another surface that slopes toward the inner end of said plunger, said one surface defining a smaller angle than said other surface relative to the longitudinal axis of said plunger, said plunger being axially movable, when said frangible means is broken, from said pre-assembled position into a preliminary assembled position wherein said plunger shank is inserted partially into said cylindrical portion of said opening and said detent lugs releasably engage said first detent-engaging groove, said plunger being further axially movable from said preliminary assembled position into a finished assembled position wherein said plunger shank is inserted fully into said conical portion of said opening and said detent lugs releasably engage said second detent-engaging groove and said plunger shank effects radially outwardly diverging flexing of said legs.

2. A fastener according to claim 1 wherein said body comprises two of said legs.

3. A fastener according to claim 1 or 2 wherein each leg is provided in the external surface thereof with a recess to facilitate flexing of said leg.

4. A fastener according to claim 1 wherein said body comprises three of said legs.

* * * * *